(12) United States Patent
Hidaka et al.

(10) Patent No.: US 6,516,529 B2
(45) Date of Patent: Feb. 11, 2003

(54) TOUCH SIGNAL PROBE

(75) Inventors: Kazuhiko Hidaka, Ibaraki (JP); Akinori Saitoh, Ibaraki (JP); Kunitoshi Nishimura, Ibaraki (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/888,317

(22) Filed: Jun. 22, 2001

(65) Prior Publication Data

US 2001/0054237 A1 Dec. 27, 2001

(30) Foreign Application Priority Data

Jun. 23, 2000 (JP) .......................... 2000-189211

(51) Int. Cl.$^7$ ................................. G01B 7/00
(52) U.S. Cl. ..................... 33/561; 33/558; 33/556; 33/559
(58) Field of Search .................. 33/556, 558, 559, 33/561

(56) References Cited

U.S. PATENT DOCUMENTS

| | | | | |
|---|---|---|---|---|
| 4,942,671 A | * | 7/1990 | Enderle et al. | ............... 33/559 |
| 5,048,194 A | * | 9/1991 | McMurtry | .................... 33/558 |
| 5,353,510 A | * | 10/1994 | Ulbrich | ........................ 33/558 |
| 5,390,423 A | * | 2/1995 | Butter et al. | .................. 33/558 |
| 5,594,995 A | * | 1/1997 | Matsuhashi | .................. 33/558 |
| 5,979,070 A | * | 11/1999 | Lau | .............................. 33/559 |
| 6,275,053 B1 | * | 8/2001 | Morrison et al. | ............. 33/556 |
| 6,327,789 B1 | * | 12/2001 | Nishimura et al. | ........... 33/561 |

FOREIGN PATENT DOCUMENTS

| | | | |
|---|---|---|---|
| EP | 0 242 747 A2 | 4/1987 | |
| EP | 0 243 766 A2 | 4/1987 | |
| GB | 1 586 052 A | 3/1981 | |
| JP | 57079406 A | * 5/1982 | .................. 33/1 N |
| JP | 10-288502 | 10/1998 | |

OTHER PUBLICATIONS

WO 98/36241, Nondirectional Touch Signal Probe, Publication Date: Aug. 20, 1998.

\* cited by examiner

*Primary Examiner*—Diego Gutierrez
*Assistant Examiner*—Travis Reis
(74) *Attorney, Agent, or Firm*—Rankin, Hill, Porter & Clark LLP

(57) ABSTRACT

A stylus has a detection element support part 1E for supporting and fixing piezoelectric elements 21 to 24 and a rod 1D placed on the detection element support part 1E. The detection element support part 1E has a plurality of flange parts 1F each being regular polygonal in cross section orthogonal to the axis of the rod 1D. The displacement detection elements are attached to the sides of the flange parts 1F in a state in which they are inclined at a predetermined angle α relative to the axis of the rod 1D. If a measured force in a torsion direction Q or in a bend direction P occurs on the rod 1D through a contact ball 1A, the measured force is transmitted along substantially the length direction of the piezoelectric elements 21 to 24.

8 Claims, 12 Drawing Sheets

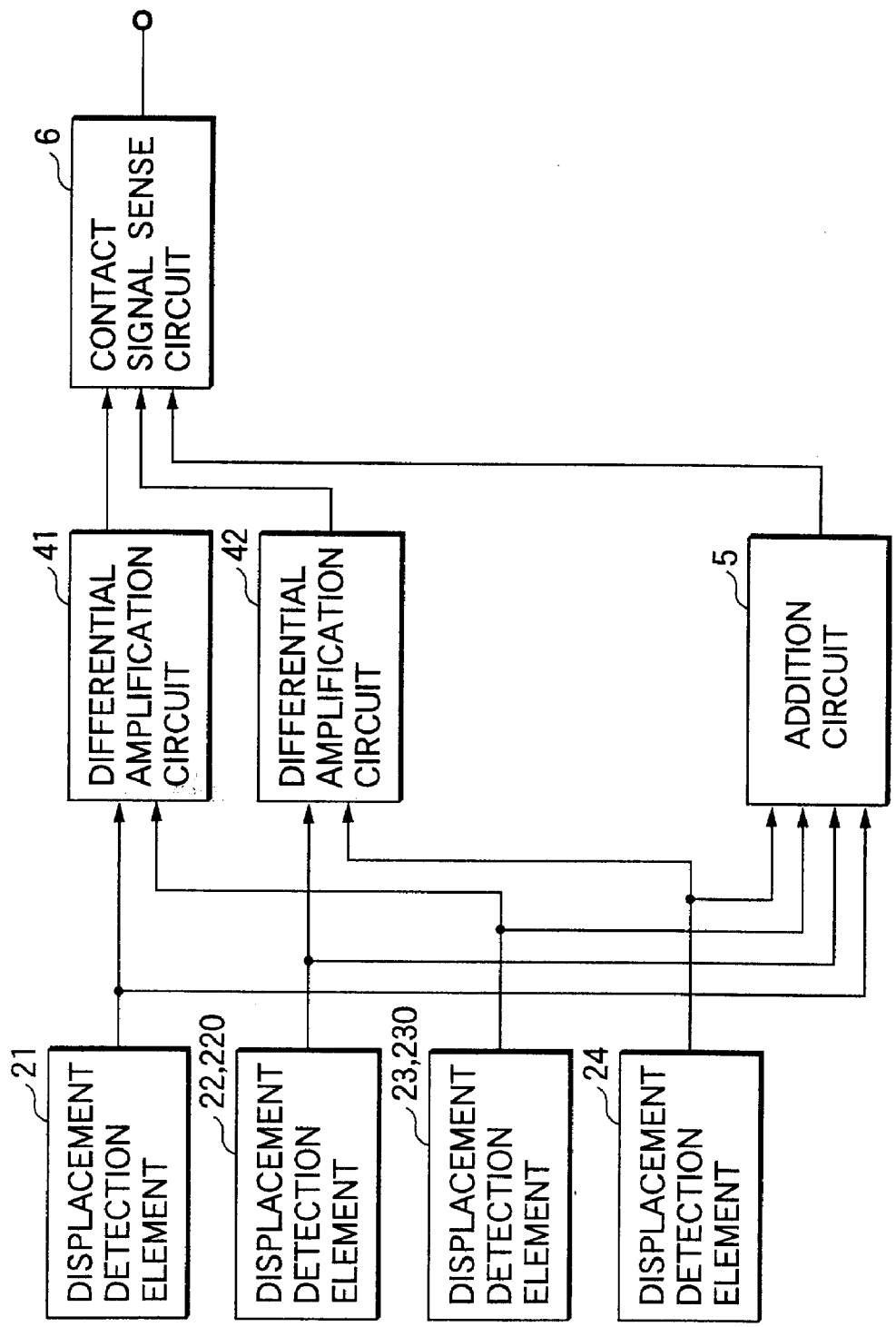

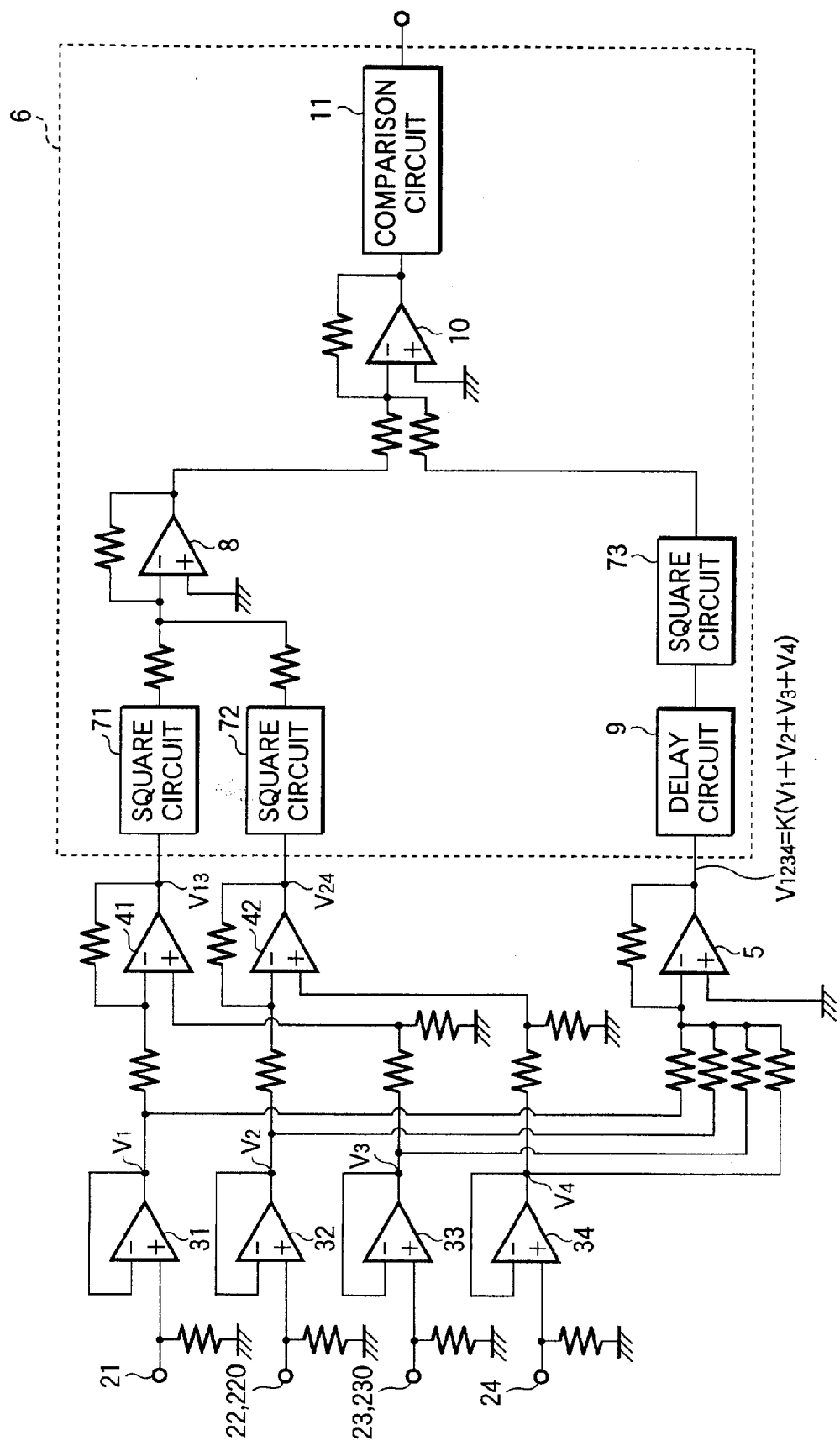

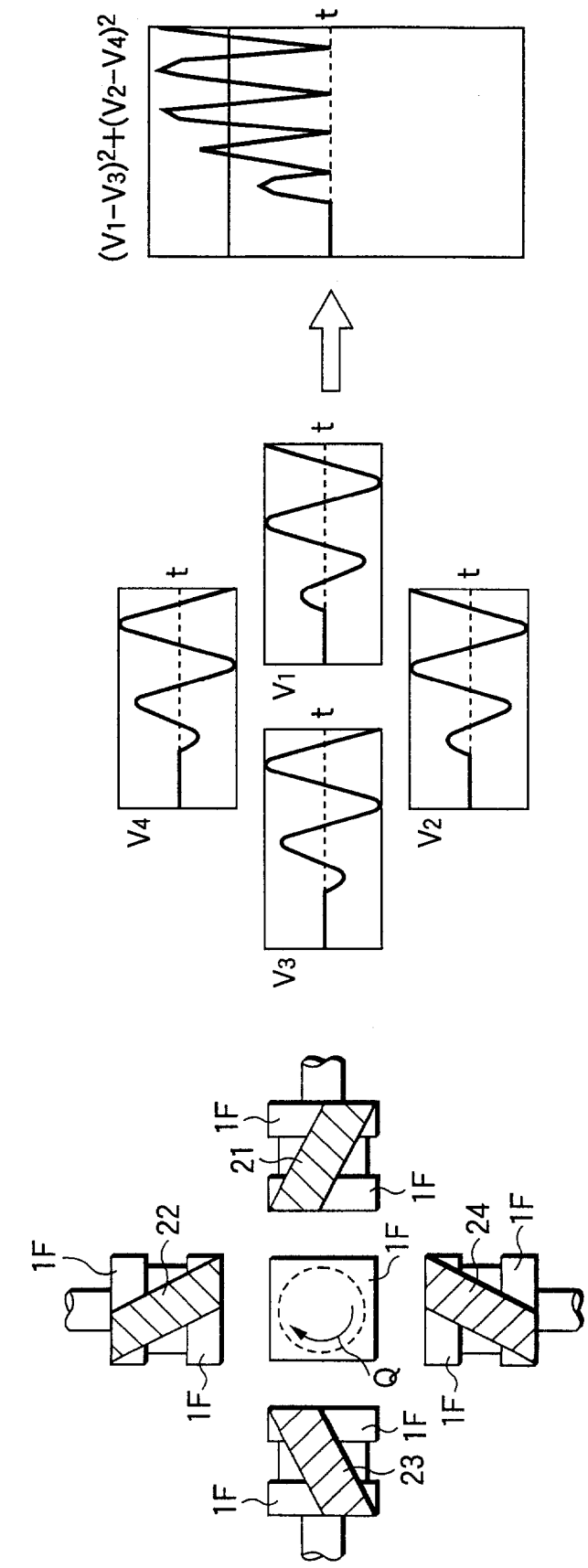

TOUCH SIGNAL PROBE

BACKGROUND OF THE INVENTION

1. Field of the Invention

This invention relates to a touch signal probe used to measure the shape of a measured object, etc., with a three-dimensional measuring machine, etc.

2. Description of the Related Art

A three-dimensional measuring machine, etc., is known as a measuring machine for measuring the shape, the dimensions, etc., of a measured object. To detect the coordinates and the position of the measured object, the measuring machine uses a touch signal probe comprising a contact ball at the tip part of a stylus to detect the contact ball coming in contact with the measured object.

A related art example of the touch signal probe is shown in Japanese Patent Unexamined Publication No. Hei. 10-288502.

In the related art example, four piezoelectric elements 121 to 124 are attached to a stylus 101, as shown in FIG. 11A. The stylus 101 comprises a rod 101B to which a contact ball 101A is attached at a tip part, and a detection element support part 101C formed integrally with a base end part of the rod 101B. The detection element support part 101C is formed at both ends with flange parts 101D each being square in cross section. The piezoelectric elements 121 to 124 are fixedly secured to the sides of the flange parts 101D. Each of the piezoelectric elements 121 to 124 is shaped like a flat rectangle parallel with an axis of the stylus in the length direction of the piezoelectric element, as shown in FIG. 11B.

In the related art example, when the contact ball 101A comes in contact with a measured object, the impact force at the contact time is detected at the piezoelectric elements 121 to 124. Contact sense signals are generated based on the sum, the difference, and the square sum of signals output from the piezoelectric elements 121 to 124, and are processed. Thus measurement with high accuracy can be conducted with directional dependence eliminated.

In the related art example, each of the piezoelectric elements 121 to 124 is placed in parallel with the axis of the stylus in the length direction of the piezoelectric element. Thus, in response to the action of the external force produced by the contact in a direction P which causes the rod 101B to bend, a force of expanding or contracting along the length direction of the piezoelectric element occurs, and the sensitivity becomes extremely good. However, the sensitivity is not necessarily sufficient depending on the direction of the external force acting on the rod 101B.

In an actual probe, the rod 101B may be provided with a plurality of contact balls 101A1 to 101A4 radially extending, as shown in FIG. 12. In the actual measurement operation with the probe shown in FIG. 12, if an external force acts on any of the contact balls 101A1 to 101A4 and a measured force in a torsion direction indicated by an arrow Q is given to stylus main body 101B, the force of expanding or contracting along the length direction of each of the piezoelectric elements 121 to 124 does not work. Thus, the sensitivity of the piezoelectric elements 121 to 124 is degraded and change in the state quantity cannot sufficiently be detected.

Thus, in the related art example, a disadvantage that a touch signal is not generated although the contact ball is in contact with the measured object occurs.

Generally, a three-dimensional measuring machine on which a touch signal probe is mounted stops the measurement operation and performs avoidance operation based on a touch signal. Thus, if a measured force in the torsion direction Q occurs in the probe shown in FIG. 12, the measurement operation cannot be stopped and it is feared that both the measured object and the three-dimensional measuring machine may be broken.

SUMMARY OF THE INVENTION

It is an object of the invention to provide a touch signal probe capable of detecting with high sensitivity not only a measured force in a bend direction of a stylus, but also measured force in a torsion direction.

Thus, the invention is intended for accomplishing the object by attaching a displacement detection element in a state in which the displacement detection element is inclined at a predetermined angle relative to an axis of a stylus to detect both the measured force in the bend direction of the stylus and the measured force in the torsion direction.

Specifically, according to the invention, there is provided a touch signal probe comprising: a stylus having as contact ball for coming in contact with a measured object at a tip; and a displacement detection element attached to the stylus for detecting the contact ball coming in contact with the measured object. In the touch signal probe, the stylus has a detection element support part for supporting and fixing the displacement detection element and a rod placed on the detection element support part. The detection element support part has a plurality of flange parts each being regular polygonal in cross section orthogonal to an axis of the rod. The displacement detection element is attached to sides of the flange parts in a state in which it is inclined at a predetermined angle $\alpha$ ($0°<\alpha<90°$) relative to the axis of the rod. Then a contact sense signal is generated based on a signal output from the displacement detection element.

In the invention, the displacement detection element is attached to the sides of the flange parts in a state in which it is inclined at the predetermined angle relative to the axis of the rod, so that if a measured force in the torsion direction occurs on the rod through the contact ball, the measured force is transmitted along substantially the length direction of the displacement detection element.

Thus, the displacement detection element is reliably expanded or contracted and is enhanced in sensitivity and can detect change in the state quantity sufficiently.

In contrast, if a measured force in the bend direction occurs on the rod through the contact ball, the measured force is transmitted along substantially the length direction of the displacement detection element.

Thus, the displacement detection element is reliably expanded or contracted and is enhanced in sensitivity and can detect change in the state quantity sufficiently.

That is, if the contact ball comes in contact with a measured object from any direction, a touch signal is reliably generated because the displacement detection element has high sensitivity. Further, the displacement detection element is attached to the sides of the polygonal bodies, so that the structure of the touch signal probe can be simplified.

In the invention, preferably the cross section of each of the flange parts orthogonal to the axis of the rod is made square and a total of four displacement detection elements are attached to the sides of the flange parts so that the displacement detection elements are spaced 90 degrees from each other.

In this configuration, a touch sense signal is generated based on the signals output from the four displacement detection elements spaced 90 degrees from each other with the stylus axis as the center, so that measurement with good accuracy can be conducted. Moreover, the cross section of each flag part is made square, so that the structure of the touch signal probe can be simplified.

The displacement detection elements may be mounted on the detection element support part so that the displacement detection elements opposed to each other become substantially mirror-symmetrical.

In this configuration, if a measured force in the torsion direction occurs on the stylus, positive and negative output signals are generated on a pair of displacement detection elements placed facing each other with the flange parts between. Thus, the difference between the signals is obtained for each of the two pairs of displacement detection elements, and the difference signals are squared and are added. Thus a large detection signal can be provided and the measurement accuracy can be improved.

Further, the displacement detection elements may be mounted on the detection element support part so that the displacement detection elements opposed to each other become symmetrical with respect to the axis of the stylus.

In this configuration, if a measured force in the torsion direction occurs on the stylus, the same positive or negative output signal is generated on all the four displacement detection elements. Thus, the signals are added, whereby a contact signal can be provided easily.

BRIEF DESCRIPTION OF THE DRAWINGS

FIG. 2 is a block diagram to show a configuration for generating contact signals from signals output from displacement detection elements (piezoelectric elements);

FIG. 3 is a circuit diagram to show the configuration for generating contact signals from signals output from the displacement detection elements (piezoelectric elements);

FIG. 5 is a schematic drawing to show the attachment state of the four displacement detection elements (piezoelectric elements), a graph to show the waveforms of signals output from the displacement detection elements, and a graph to show a waveform into which the waveforms are combined;

DETAILED DESCRIPTION OF THE INVENTION

Referring now to the accompanying drawings, there are shown preferred embodiments of the invention.

Figure 1:
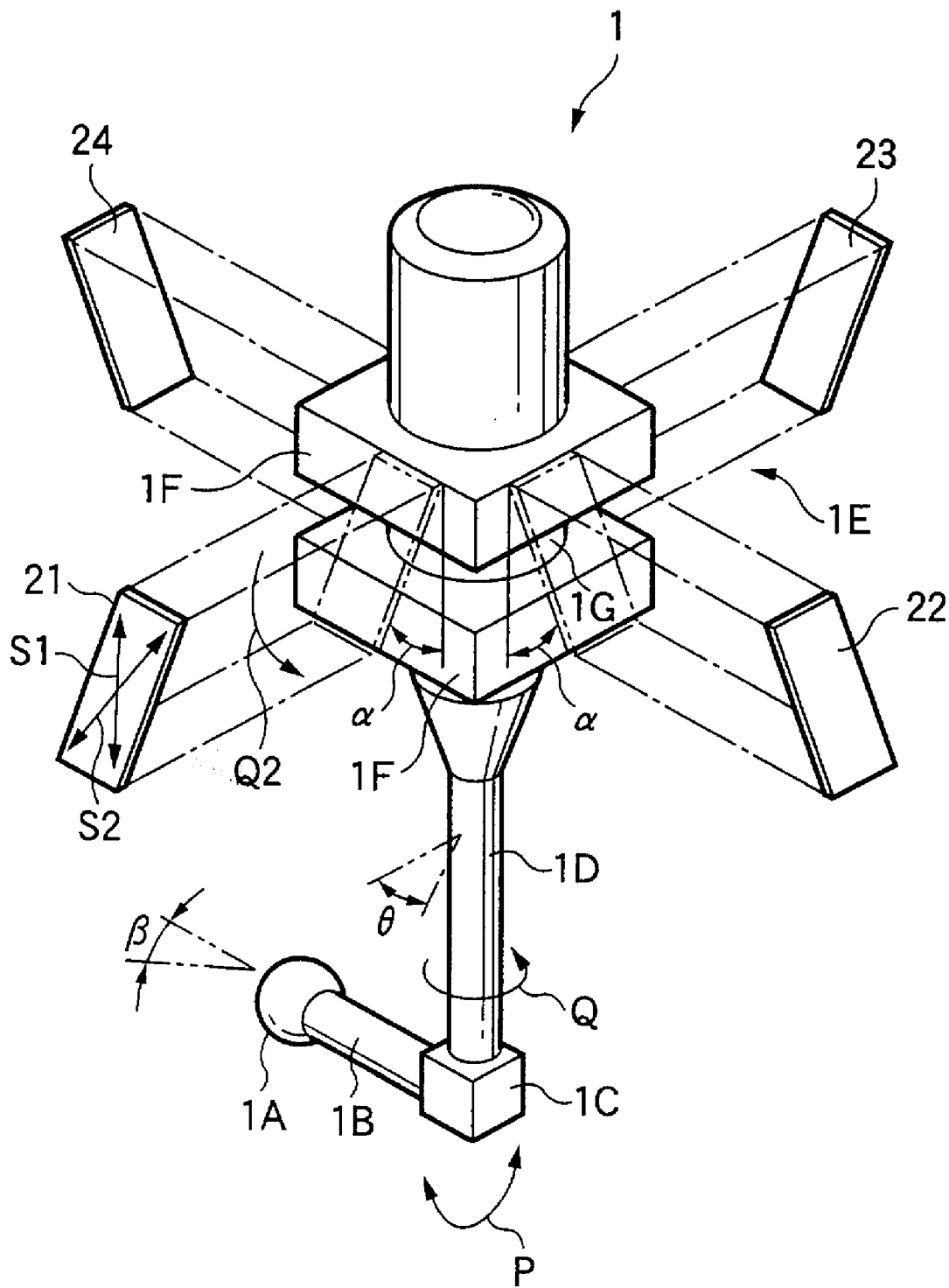
FIG. 1 a perspective view to show a touch signal probe according a first embodiment of the invention.

FIG. 1 shows the general configuration of a touch signal probe according to a first embodiment of the invention.

In FIG. 1, the touch signal probe of the first embodiment has a structure wherein four piezoelectric elements 21 to 24 as displacement detection elements are attached to a stylus 1. The stylus 1 comprises a contact ball 1A, an attachment part 1B, a rod 1D, and a detection element support part 1E. The contact ball 1A comes in contact with a measured object. The attachment part 1B is shaped like a column to which the contact ball 1A is attached at a tip part. The rod 1D is substantially circular in cross section and attached to a base end part of the attachment part 1B at a tip part via a block body 1C. The detection element support part 1E is formed integrally with an opposite end part of the rod 1D.

The block body 1C, the rod 1D, and the detection element support part 1E are placed on an axis of the stylus.

The rod 1D is formed like a column on the block body side and like a cone on the detection element support part side.

Figure 12:
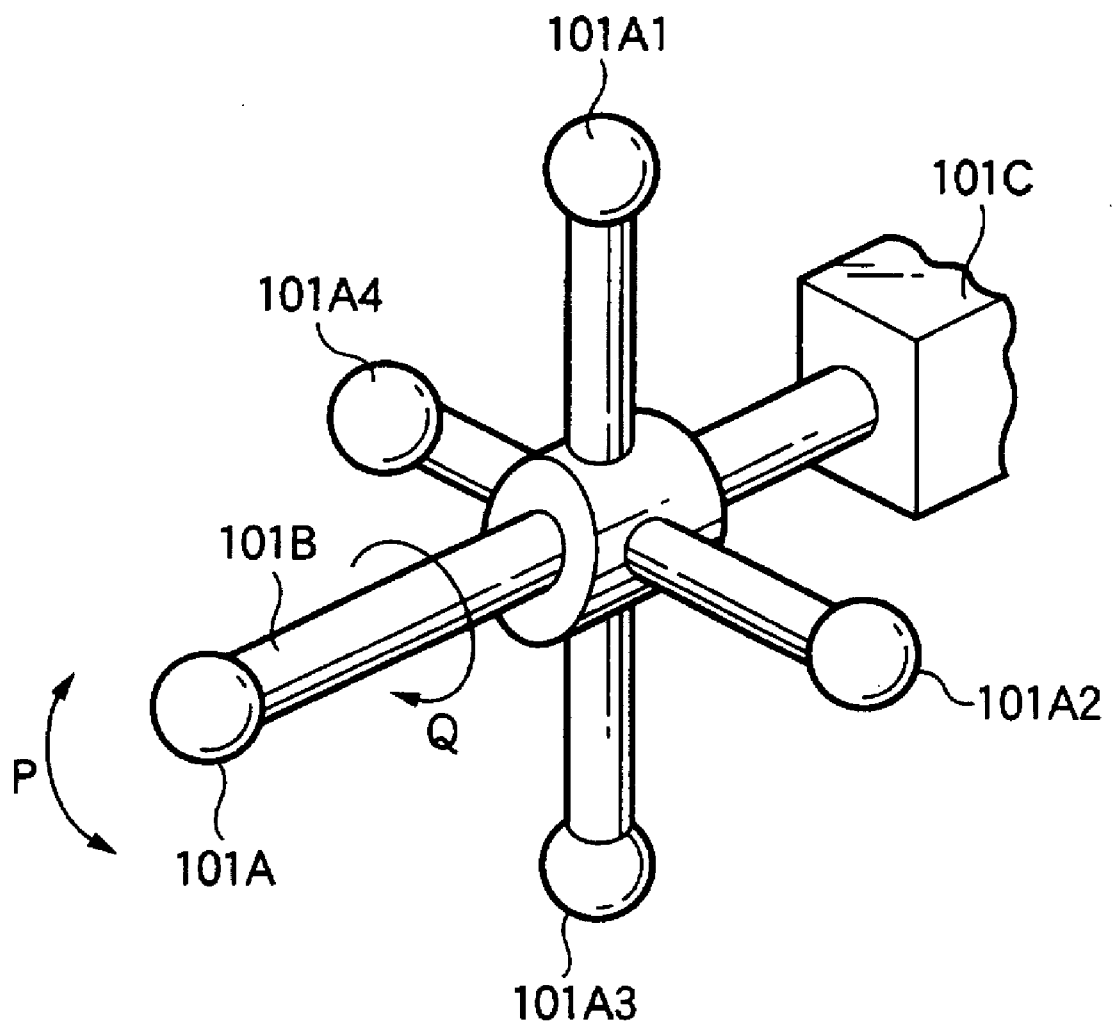
FIG. 12 is a perspective view to describe a disadvantage of a related art example.

The attachment part 1B and the rod 1D are formed at a right angle with the block body 1C as the center. In the embodiment, a plurality of the attachment parts 1B each provided with the contact ball 1A at the tip part may be attached to the block body 1C in the radial direction and axial direction of the rod 1D (see FIG. 12).

The detection element support part 1E comprises two flange parts 1F and a joint part 1G. Each of flange parts 1F is square in cross section orthogonal to the axis of the rod 1D. The joint part 1G is shaped substantially like a column for joining the flange parts 1F.

The piezoelectric elements 21 to 24 are attached to rectangular sides of the flange parts 1F in an inclination state at a predetermined angle α (0°<α<90°) with respect to the axis of the rod 1D. In the embodiment, each of the piezoelectric elements 21 to 24 has a plane formed substantially like a parallelogram, and sides along the length direction of the parallelogram is inclined at the predetermined angle α (0<α<90°) with respect to the axis of the rod 1D. Each of the piezoelectric elements 21 to 24 is fixedly secured at both end parts along the length direction thereof to the sides of the flange parts 1F facing each other with an adhesive, etc.

The piezoelectric elements 21 and 24 are of the same shape and the piezoelectric elements 22 and 23 are of the same shape. The piezoelectric elements 21 and 24 and the piezoelectric elements 22 and 23 are of the same shape except for symmetry.

The full face of each of the piezoelectric elements 21 to 24 forms an electrode. The piezoelectric elements 21 and 23 facing each other are mounted on the detection element support part 1E so as to become substantially mirror-symmetrical. Likewise, the piezoelectric elements 22 and 24 facing each other are mounted on the detection element support part 1E so as to become substantially mirror-symmetrical.

Here, considering the case where a measured object comes in contact with the contact ball 1A and a force in a bend direction P acts on the rod 1D, the force is transmitted in a direction S1 along substantially the length direction of each of the piezoelectric elements 21 to 24. Thus, output of a predetermined piezoelectric element, for example, the piezoelectric element 21 becomes the maximum value at the point in time determined by the natural frequency, etc., of the stylus 1 after the contact ball 1A comes in contact with the measured object. The magnitude of the maximum value varies depending on the angle between the attachment direction of the piezoelectric element 21 and the direction of the stylus 1 coming in contact with the measured object. Namely, the magnitude of the maximum value varies depending on angle θ of the piezoelectric element 21 around the axis of the stylus 1 and changes like a sine wave on 360-degree periods.

The output maximum value reaches the maximum value when the measured object and the stylus 1 come in contact with each other at an angle at which the piezoelectric element 21 is easily subject to bend deformation (θ=0) (refer to the above-mentioned Japanese Patent Unexamined Publication No. Hei. 10-288502).

FIG. 2 is a block diagram to generate contact signals based on output of the four piezoelectric elements 21 to 24 and FIG. 3 is a circuit diagram.

In FIGS. 2 and 3, signals output from the piezoelectric elements 21 to 24 are amplified by amplification circuits 31 to 34 to generate $V_1$ to $V_4$. Then a difference $V_{13}$ between the signals $V_1$ and $V_3$ output from the piezoelectric elements 21 and 23 facing each other (front and back) is calculated by a differential amplification circuit 41, and a difference $V_{24}$ between the signals $V_2$ and $V_4$ output from the piezoelectric elements 22 and 24 facing each other (front and back) is calculated by a differential amplification circuit 42. First contact signals are generated by the differential amplification circuits 41 and 42.

Further, a sum $V_{1234}$ of the signals $V_1$ to $V_4$ output from the piezoelectric elements 21 to 24 and amplified by the amplification circuits 31 to 34 is calculated by an addition circuit 5 to generate a second contact signal.

The reason why the difference $V_{13}$ ($V_{24}$) between the output signals of the piezoelectric elements 21 and 23 (22 and 24) is calculated is that as the output signals from the piezoelectric elements 21 and 23 (22 and 24) different in attachment angle by 180 degrees with the axis of the stylus as the center differ in phase by 180 degrees, a bend distortion component acting on the axis of the stylus is extracted by the calculation.

Further, the sum $V_{1234}$ of the output signals of the four piezoelectric elements 21 to 24 is calculated to remove the bend distortion component acting on the axis of the stylus and extract a longitudinal distortion component acting in the axial direction of the stylus. In the embodiment, to extract the longitudinal distortion component, the sum of the outputs signals of all the four piezoelectric elements 21 to 24 is obtained. However, the invention is not limited to it, and the sum of the output signals from the two piezoelectric elements 21 and 23 or 22 and 24 facing each other (front and back) may be calculated.

A contact signal sense circuit 6 generates a sense signal from the first contact signals generated by the differential amplification circuits 41 and 42 and the second contact signal generated by the addition circuit 5.

The contact signal sense circuit 6 squares the output signal differences ($V_{13}$ and $V_{24}$) of the first contact signals by square circuits 71 and 72 respectively and then add the results by an addition circuit 8 to generate one signal. The output signal differences are squared and the results are added to make constant the maximum value of output from the piezoelectric elements 21 and 23 (22 and 24) different in attachment angle by 90 degrees regardless of the angle θ.

That is, let the maximum value of the differential output of the piezoelectric elements 21 and 23 be $$V_{13}=V_{max} \times \cos(\theta_0) \qquad \text{[Expression 1]}$$

Let the maximum value of the differential output of the piezoelectric elements 22 and 24 be $$V_{24}=V_{max} \times \cos(\theta_0+90) \qquad \text{[Expression 2]}$$

$$(V_{13})^2+(V_{24})^2=(V_{max})^2 \qquad \text{[Expression 3]}$$

Thus, the maximum value of the output at a predetermined time becomes $(V_{max})^2$ regardless of the angle.

This description applies to the case where the measured object comes in contact with the contact ball 1A from the direction in which the stylus 1 is orthogonal to the stylus axis. The maximum value of the output when touching the stylus axis at an angle of β becomes $\{V_{max} \times \cos \beta\}^2$. The angle β is the angle between the direction orthogonal to the stylus axis (the axis of the rod 1D) and the direction in which the contact ball 1A comes in contact with the measured object.

Since the first contact signal $V_{13}(V_{24})$ is the differential signal of the piezoelectric elements 21 and 23 (22 and 24) positioned at positioned at front and back of the stylus, $V_{max} \times \cos \beta$ is a signal representing the bend distortion component of the detection element support part 1E.

In FIG. 3, the sum signal $V_{1234}$ calculated by the addition circuit 5 is obtained according to the following expression where K is an amplification factor:

$$V_{1234}=K(V_1+V_2+V_3+V_4) \qquad \text{[Expression 4]}$$

$V_{1234}$ is a signal representing a longitudinal distortion component with the bend distortion component removed and becomes maximum value $V_M$ when β is 90 degrees, namely, when the contact ball 1A comes in contact with the measured object from the direction of the axis of the stylus. The maximum value of the output when touching the axis of the stylus at the angle of β becomes $$V_{1234}=V_M \times \sin \beta \qquad \text{[Expression 5]}$$

However, the time forming the maximum value of $\{V_{max} \times \cos \beta\}^2$ and the time for $V_{1234}$ to form the maxim value generally differ. That is, the rigidity in the longitudinal direction generally is higher than the bend rigidity and thus $V_{1234}$ is earlier with respect to time.

Therefore, gain adjustment is made so that $V_M=V_{max}$ and then the $V_{1234}$ signal is provided with a proper time delay by a delay circuit 9 and then is squared by a square circuit 73.

The $(V_{1234})^2$ signal provided by the square circuit 73 and the $\{V_{max} \times \cos \beta\}^2$ signal are added by an addition circuit 10. The addition result becomes $$(V_{1234})^2+\{V_{max} \times \cos \beta\}^2=V_{max}^2 \qquad \text{[Expression 6]}$$

A constant signal is provided regardless of the contact angle β.

That is, the signal corresponding to the longitudinal distortion for forming the maximum value earlier with respect to the time is delayed by a predetermined time, whereby the maximum value is formed at the same timing as the signal corresponding to the bend distortion. Thus if the measured object comes in contact with any point of the contact ball 1A, the same output can be generated.

Then, the signal is compared with a predetermined reference value by a comparison circuit 11 and if the signal exceeds the reference value, a contract signal is generated.

In the embodiment, the technique is not limited to the technique of squaring the ($V_{1234}$) signal and then providing the result with a proper time delay and may be changed in accordance with the gist of the embodiment in such a manner that the signal is squared after being given a delay, for example.

Further, after the ($V_{1234}$) signal is provided with a proper time delay, the following calculation may be performed:

$$(V_{13})^2+(V_{24})^2=(V_{1234})^2 \qquad \text{[Expression 7]}$$

In this case, the same result as that described above can also be provided.

Figure 4A:
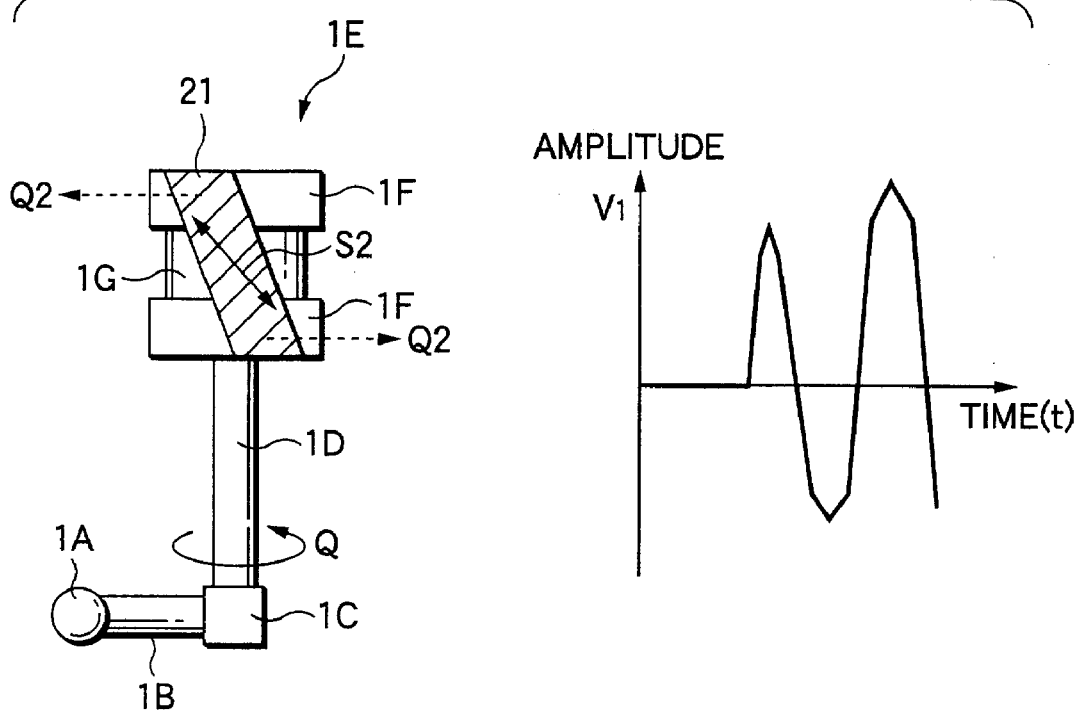
FIGS. 4A and 4B are respectively schematic drawings to the attachment state of the displacement detection elements facing each other, and graphs to show the waveforms of signals output from the displacement detection elements.
Figure 4B:
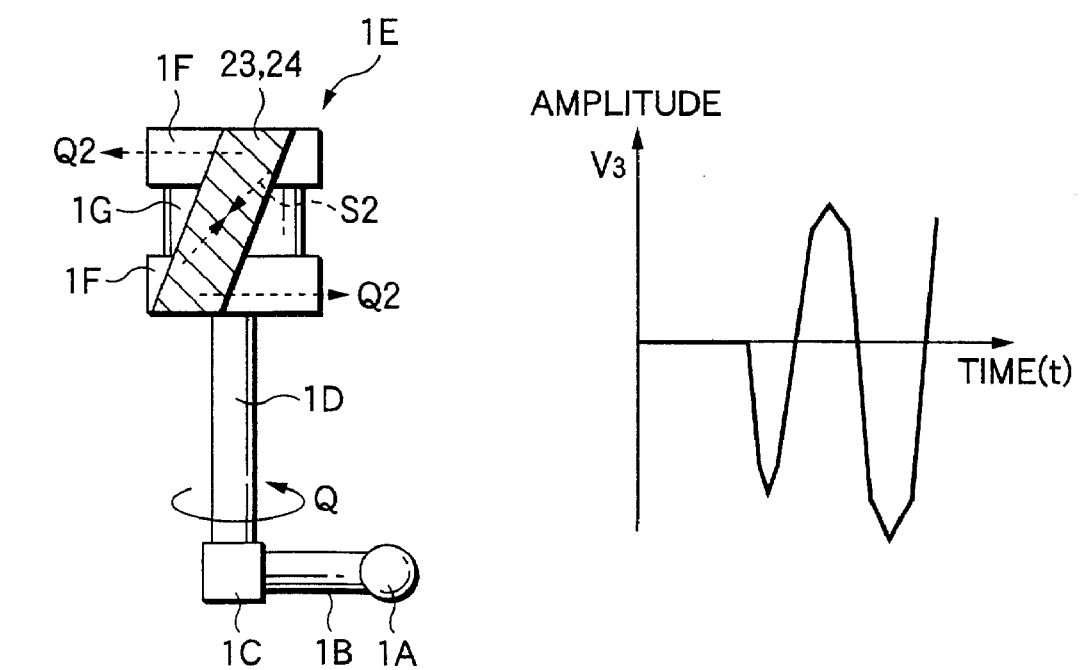

Here, as shown in FIGS. 4A and 4B, considering the case where a measured object comes in contact with the contact ball 1A and a force in the torsion direction Q acts on the rod ID, in the two flange parts 1F, force Q2 works in opposite directions by the force Q, whereby the force is transmitted in a direction S2 along substantially the length direction of each of the piezoelectric elements 21 to 24. In the embodiment, the piezoelectric elements 21 and 23 opposed to each other are made mirror-symmetrical with each other with the detection element support part 1E between. Thus, an outward shearing force (in an expansion direction) works on the piezoelectric element 21 along the S2 direction as shown in FIG. 4A, and an inward shearing force (in a contraction direction) works on the piezoelectric element 23 along the S2 direction as shown in FIG. 4B. If the torsion direction is opposite to Q, the shearing forces work on the piezoelectric elements 21 and 23 in opposite directions.

This means that an amplitude signal $V_3$ output from the piezoelectric element 23 is inverted with respect to an amplitude signal $V_1$ output from the piezoelectric element 21. Likewise, an amplitude signal $V_4$ output from the piezoelectric element 24 is inverted with respect to an amplitude signal $V_2$ output from the piezoelectric element 22.

The signals output from the piezoelectric elements 21 to 24 are processed by the control circuit shown in FIG. 3 to generate a contract signal.

That is, the signals output from the piezoelectric elements 21 to 24 are amplified by the amplification circuits 31 to 34 to generate $V_1$ to $V_4$. Then the difference $V_{13}$ between the signals $V_1$ and $V_3$ output from the piezoelectric elements 21 and 23 facing each other (front and back) is calculated by the differential amplification circuit 41, and the difference $V_{24}$ between the signals $V_2$ and $V_4$ output from the piezoelectric elements 22 and 24 facing each other (front and back) is calculated by the differential amplification circuit 42. The difference $V_{13}$ ($V_1-V_3$) obtained by the differential amplification circuit 41 is squared by the square circuit 71, and the difference $V_{24}$ ($V_2-V_4$) obtained by the differential amplification circuit 42 is squared by the square circuit 72. The results are added by the addition circuit 8 to generate one signal (see a graph in FIG. 5).

The signal is compared with the predetermined reference value by the comparison circuit 11 and if the signal exceeds the reference value, a contract signal is generated. The signals $V_1$ to $V_4$ provided by the amplification circuits 31 to 34 are sent to the addition circuit 5. In the embodiment, the signals $V_1$ ($V_2$) and $V_3$ ($V_4$) output from the piezoelectric elements 21 (22) and 23 (24) facing each other (front and back) are inverted each other. Thus if the signals are simply added, the result becomes 0 or an extremely small value, and the signal sent from the addition circuit 5 to the square circuit 73 and the addition circuit 10 can be ignored.

Therefore, (1) in the first embodiment, in the touch signal probe wherein the displacement detection elements (piezoelectric elements 21 to 24) are placed on the stylus 1 for detecting the contact ball 1A coming in contact with a measured object, the stylus 1 has the detection element support part 1E for supporting and fixing the displacement detection elements and the rod 1D placed on the detection element support part 1E. The detection element support part 1E has a plurality of flange parts 1F each being regular polygonal in cross section orthogonal to the axis of the rod 1D. The displacement detection elements are attached to the sides of the flange parts 1F in a state in which they are inclined at the predetermined angle α relative to the axis of the rod 1D. Then a contact sense signal is generated based on signals output from the displacement detection elements. Thus, if a measured force in the torsion direction Q occurs on the rod 1D through the contact ball 1A, the measured force is transmitted along substantially the length direction of the displacement detection element, so that the displacement detection element is reliably expanded or contracted and can detect change in the state quantity sufficiently. Further, if a measured force in the bend direction P occurs on the rod 1D through the contact ball 1A, the measured force is transmitted along substantially the length direction of the displacement detection element, so that the displacement detection element is reliably expanded or contracted and can detect change in the state quantity sufficiently.

(2) Since the piezoelectric elements 21 to 24 are used as the displacement detection elements, the impact force when the contact ball 1A of the stylus 1 comes in contact with a measured object can be detected reliably, so that measurement with high accuracy can be conducted.

(3) The cross section of each of the flange parts 1F orthogonal to the axis of the rod 1D is made square and a total of four piezoelectric elements 21 to 24 are attached to the sides of the flange parts 1F so that the displacement detection elements are spaced 90 degrees from each other. Thus, a touch sense signal is generated based on the signals output from the four piezoelectric elements 21 to 24 spaced 90 degrees from each other with the stylus axis as the center, so that measurement with good accuracy can be conducted. Moreover, the cross section of each flag part 1F is square, so that the structure of the touch signal probe can be simplified.

(4) If a measured force in the bend direction P occurs on the stylus 1, first contact signal is generated from the two differential signals $V_{13}$ and $V_{24}$ output from the two pairs of piezoelectric elements 21 and 23 and 22 and 24 positioned at front and back of the stylus, and a second contact signal is generated from the signal of the sum of the signals output from the four piezoelectric elements 21 to 24, $V_{1234}$, or the signal of the sum of the signals output from the two pairs of displacement detection elements 21 and 23 and 22 and 24 positioned at front and back. The second contact signal is delayed by the predetermined time and then is logical-added with the first contact signal to generate a contact sense signal. Thus, to generate the contact sense signal by logical-adding the first contact signal and the second contact signal together, the second contact signal corresponding to the longitudinal distortion forming the maximum value earlier with respect to the time is delayed by the predetermined time. Thus if the measured object comes in contact with any point of the contact ball, the same output occurs and thus measurement can also be made highly accurate from this point.

(5) A contact sense signal when a measured force in the torsion direction occurs on the rod 1D is generated according to the circuit configuration for generating a contact sense signal when a measured force in the bend direction of the rod 1D occurs. Namely, the circuit configuration comprises the differential amplification circuit 41 (42) for calculating the difference between the signals output from the piezoelectric elements 21 and 23 (22 and 24) facing each other (front and back), the addition circuit 5 for calculating the sum of the signals output from all the piezoelectric elements 21 to 24, and the contact signal sense circuit 6 for generating a sense signal. from the contact signals generated by the differential amplification circuit 41 and 42 and the contact signal generated by the addition circuit 5. Thus, the circuit configuration can be made common and the structure of the touch signal probe can be simplified.

(6) The piezoelectric elements 21 to 24 are mounted on the detection element support part 1E so that the piezoelectric elements 21 and 23 (22 and 24) opposed to each other become substantially mirror-symmetrical. Thus, if a measured force in the torsion direction Q occurs on the stylus, positive and negative output signals are generated on a pair of piezoelectric elements 21 and 23 (22 and 24) placed facing each other with the flange parts 1F between. Thus, the difference between the signals is obtained for each of the two pairs of displacement detection elements 21 and 23 and 22 and 24 and the difference signals are squared and are added. Therefore, a large detection signal can be provided and the measurement accuracy can be improved.

Next, a second embodiment of the invention will be discussed with reference to FIG. 6.

The second embodiment is the same as the first embodiment except for the configuration of piezoelectric elements. Therefore, parts identical with those previously described with reference to FIG. 1 are denoted by the same reference numerals in FIG. 6 and will not be discussed again in detail.

Figure 6:
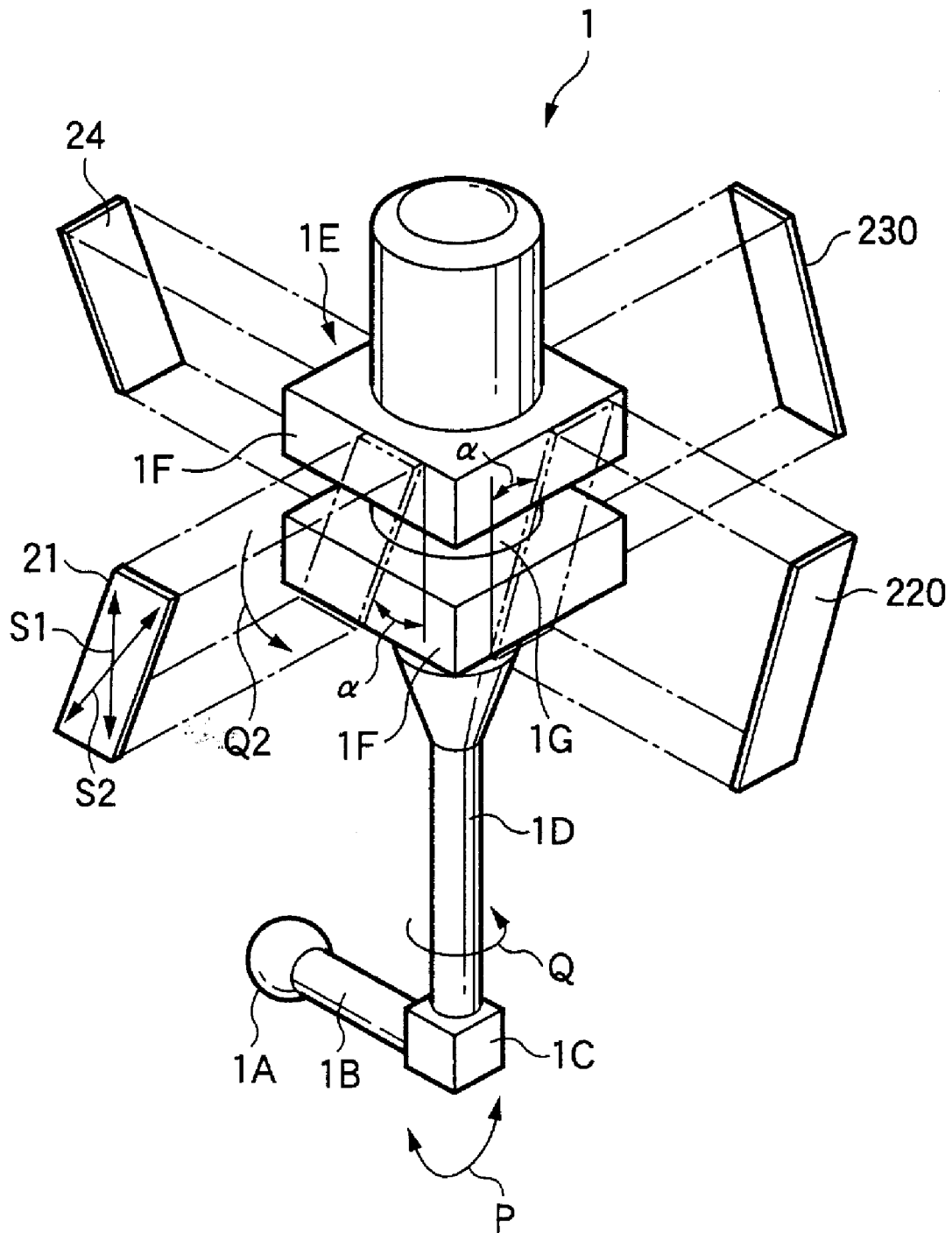
FIG. 6 a perspective view to show a touch signal probe according a second embodiment of the invention.

In FIG. 6, in the second embodiment, displacement detection elements are piezoelectric elements 21, 220, 230, and 24. One pair of piezoelectric elements 21 and 230 opposed to each other is mounted on a detection element support part 1E so as to become symmetrical with respect to the axis of a stylus. The other pair of piezoelectric elements 220 and 24 is also mounted on the detection element support part 1E so as to become symmetrical with respect to the axis of the stylus. The piezoelectric elements 21, 220, 230, and 24 are of the same shape.

A structure for generating a contact signal based on output of the piezoelectric elements 21, 220, 230, and 24 in the second embodiment is the structure previously described with reference to FIGS. 2 and 3 as in the first embodiment.

In the second embodiment, a procedure of generating a contact signal when a measured object comes in contact with a contact ball 1A and a measured force in a bend direction P acts on a rod 1D is the same as that in the first embodiment.

When a measured object comes in contact with the contact ball 1A and a force in a torsion direction Q acts on the rod 1D, a force is transmitted in a direction S2 along substantially the length direction of each of the piezoelectric elements 21, 220, 230, and 24 by the force Q.

A shearing force in the same direction along the S2 direction works on every piezoelectric element 21, 220, 230, 24, and the same detection signals are output from the piezoelectric elements 21, 220, 230, and 24.

The detection signals are amplified by amplification circuits 31 to 34 to generate $V_1$ to $V_4$ and then the sum of the signals $V_1$ to $V_4$, $V_{1234}$, is calculated by an addition circuit 5.

The sum signal provided by the addition circuit 5 is provided with a proper time delay by a delay circuit 9 and then squared by a square circuit 73. The signal output from the square circuit 73 is compared with a predetermined reference value by a comparison circuit 11 and if the signal exceeds the reference value, a contract signal is generated. In the embodiment, as the signals $V_1$ to $V_4$ provided by the amplification circuits 31 to 34 are sent to differential amplification circuits 41 and 42, the signals $V_1$ to $V_4$ are detection signals of the same value and thus become 0 or an extremely small value in the differential amplification circuits 41 and 42, and the signal sent to the addition circuits 8 and 10 can be ignored. A negative signal may be output from the piezoelectric element 21, 220, 230, 24, in which case the absolute value of the signal is obtained by appropriate means.

Therefore, in the second embodiment, advantages similar to (1), (2), (3), (4), and (5) in the first embodiment can be provided and in addition, (7) the piezoelectric elements 21, 220, 230, and 24 are mounted on the detection element support part 1E so that the piezoelectric elements 21 and 220 (230 and 24) opposed to each other become symmetrical with respect to the axis of the stylus. Thus, if a measured force in the torsion direction Q occurs on the stylus 1, the same positive or negative output signal is generated on all the four piezoelectric elements 21, 220, 230, and 24. Thus, the signals are added, whereby a contact signal can be provided easily.

The invention is not limited to the described embodiments and contains modifications and improvements in the scope in which the object of the invention can be accomplished.

Figure 7:
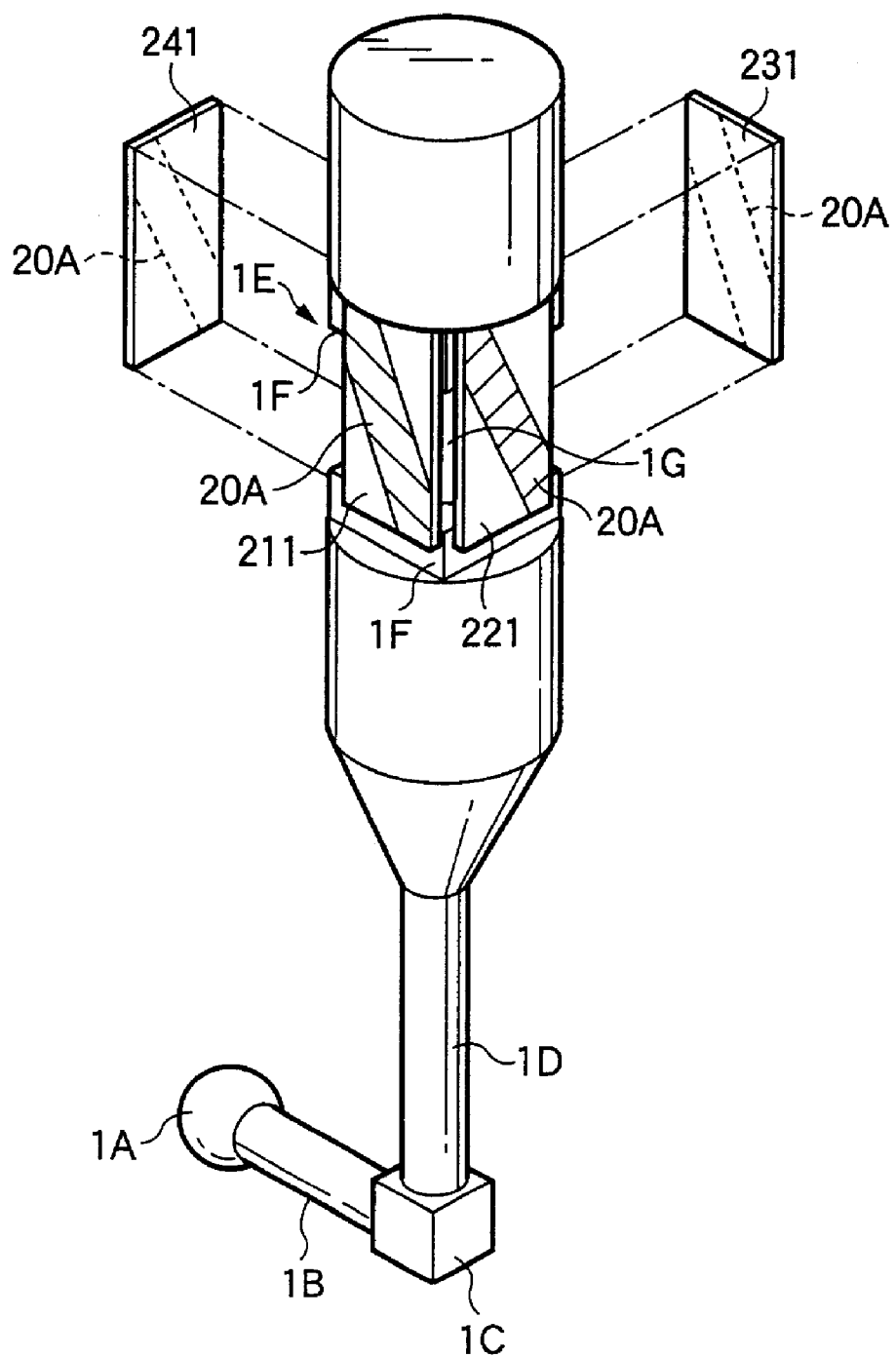
FIG. 7 is a perspective view to show a modified example of the invention.

For example, in the described embodiments, the piezoelectric elements 21 to 24, 220, 230 are attached in the state in which they are inclined at the predetermined angle α relative to the axis of the rod 1D. However, in the invention, if an electrode 20A forming the displacement detection element is formed so that it is inclined at the predetermined angle α relative to the axis of the rod 1D, piezoelectric elements 211, 221, 23, 241 each shaped like a flat rectangle may be placed so as to become parallel with the axis of the rod 1D in the length direction, as shown in FIG. 7.

Figure 8:
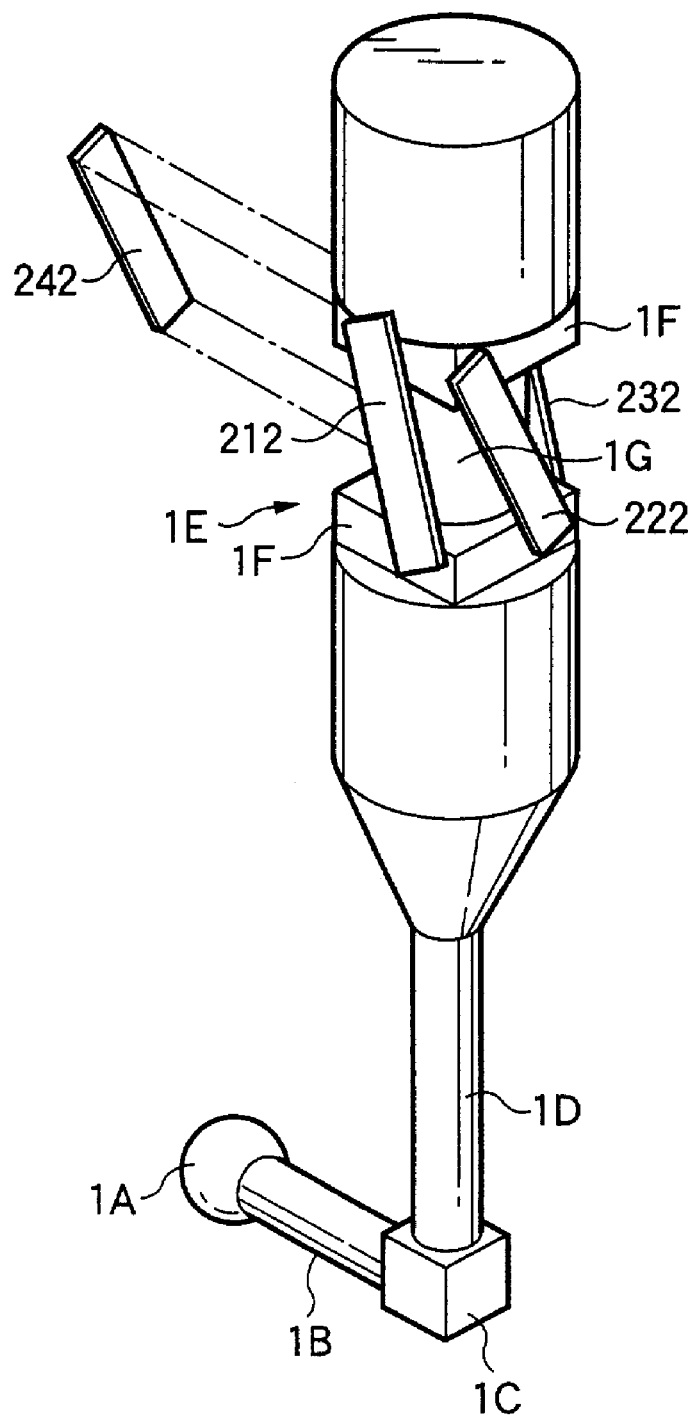
FIG. 8 is a perspective view to show another modified example of the invention.

In the described embodiments, the piezoelectric elements 21 to 24, 220, 230 are flat parallelograms. In the invention, however, piezoelectric element 212, 222, 232, 242 may be formed like a rectangle, as shown in FIG. 8, if it is formed so that it is inclined at the predetermined angle α relative to the axis of the rod 1D.

Figure 9:
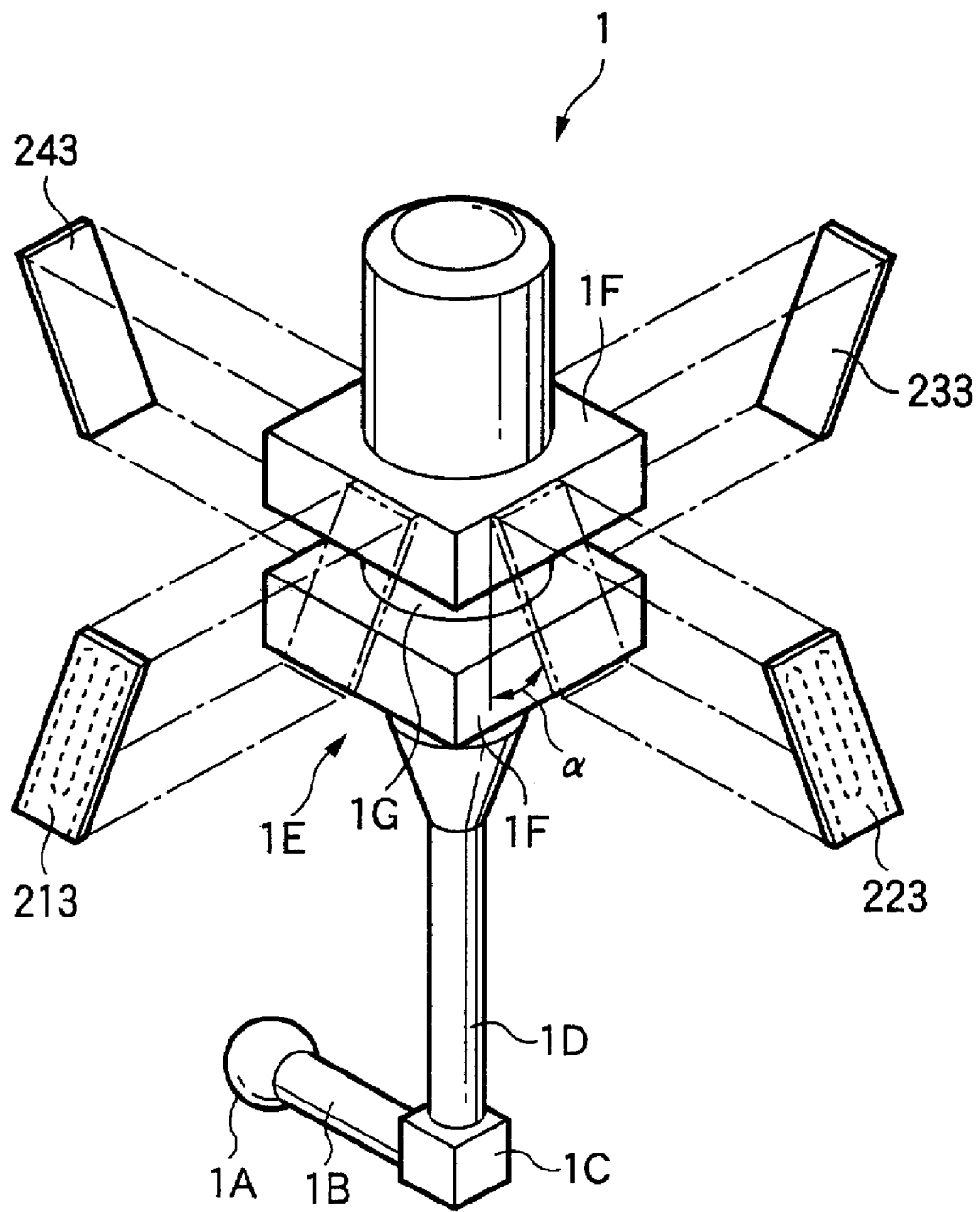
FIG. 9 is a perspective view to show still another modified example of the invention.

Further, in the described embodiments, the displacement detection elements are the piezoelectric elements 21 to 24, 220, and 230. In the invention, however, distortion gages 213, 223, 233, and 243 may be used in place of the piezoelectric elements, as shown in FIG. 9, if they can detect displacement in the bend direction of the stylus 1 and that in the torsion direction.

In short, in the invention, the types, the sizes, the shapes, the attachment angle α, the aspect ratio, and the like of displacement detection elements are set in accordance with the shape of the stylus 1 and any other condition.

Figure 10:
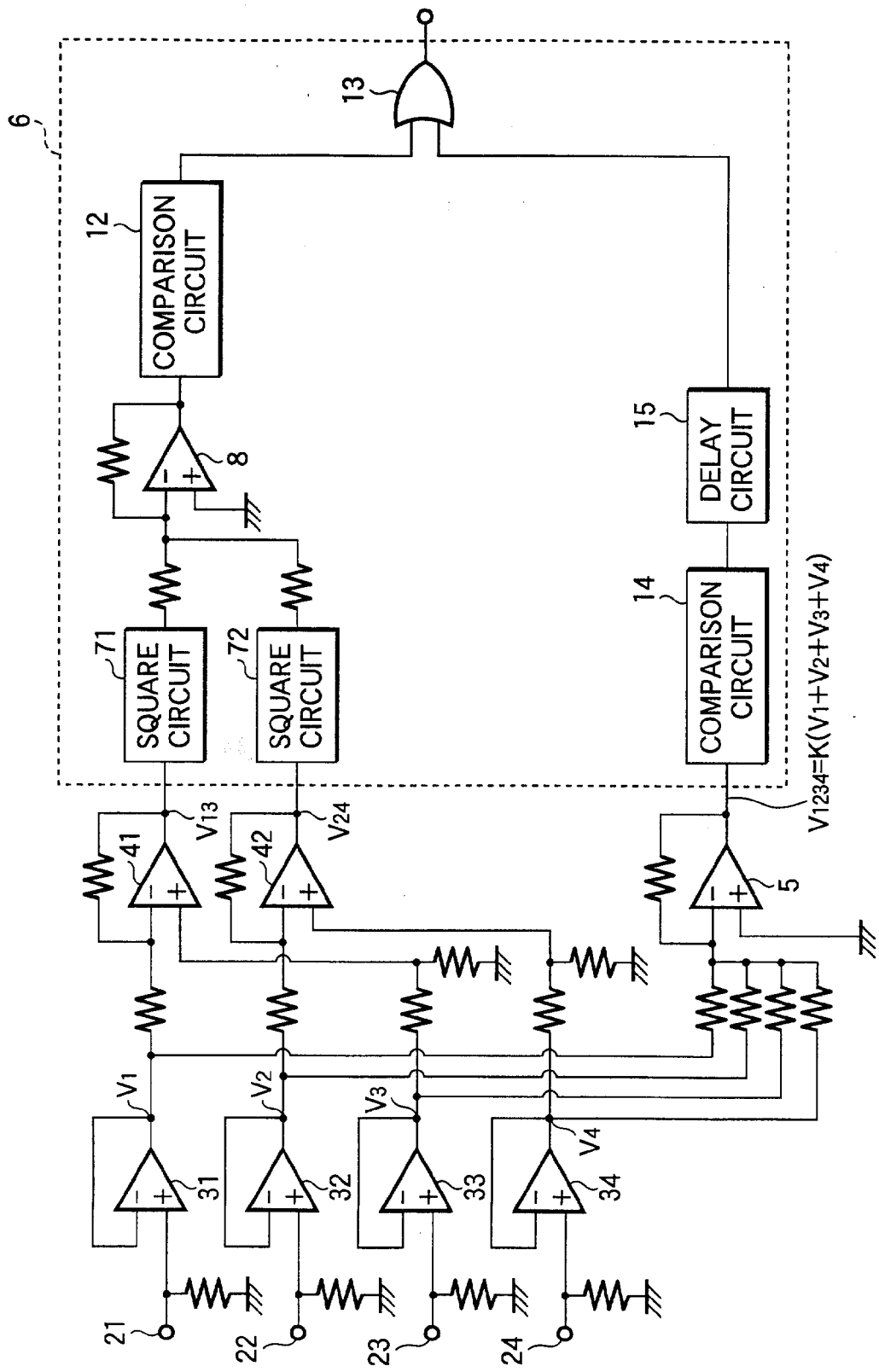
FIG. 10 shows still another modified example of the invention and is a circuit diagram to show a configuration for generating a contact signal from signals output from piezoelectric elements.
Figure 11A:
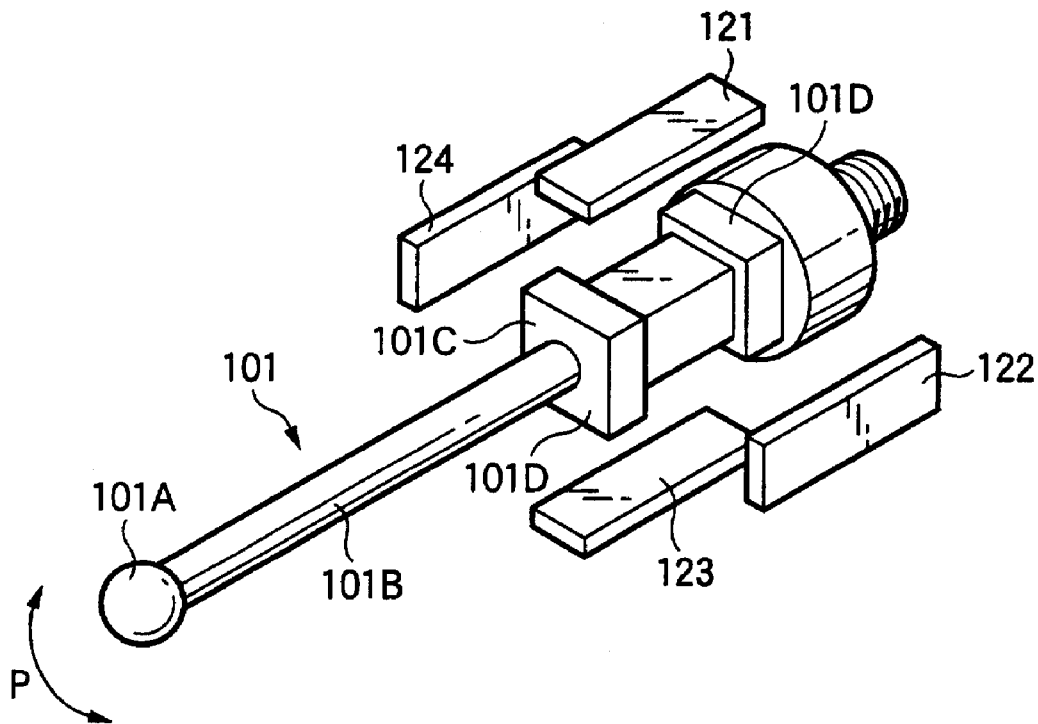
FIG. 11A is a perspective view to show a state before displacement detection elements are attached.
Figure 11B:
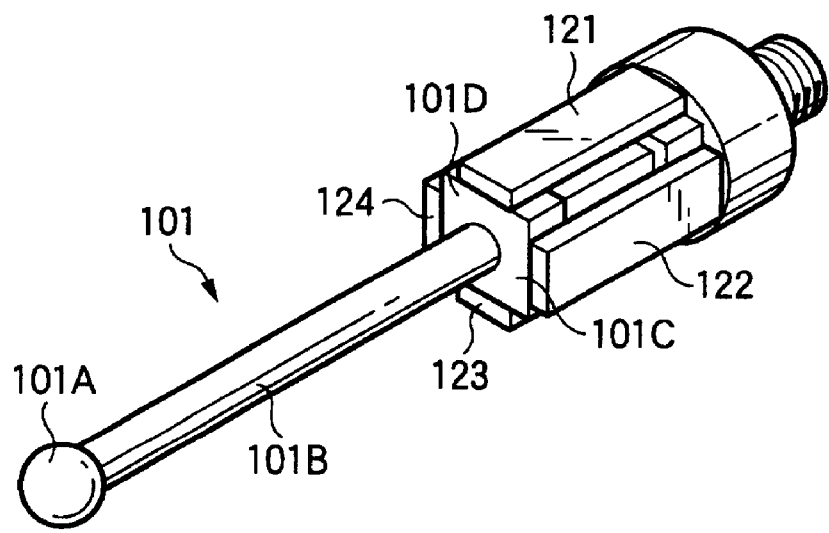
FIG. 11B is a perspective view to show a state after the displacement detection elements are attached.

Further, in the invention, the following configuration may be adopted: As shown in FIG. 10, the signal $\{V_{max} \times COS\, \beta\}^2$ output from an addition circuit 8 is compared with a reference value by a comparison circuit 12 and if the signal exceeds the reference value, a contact signal is generated through an OR circuit 13. On the other hand, if the sum signal $V_{1234}$ provided by an addition circuit 5 is compared with a reference value by a comparison circuit 14 and if the signal exceeds the reference value, it is delayed by a predetermined time by a delay circuit 15 and a contact signal is generated through the OR circuit 13.

Further, in FIGS. 3 and 10, the contact signal generation circuit is implemented as an analog circuit, but may be implemented as a digital circuit.

Further, in the description of the embodiments, four piezoelectric elements 21–24, 220, 230 are provided; in the invention, however, two piezoelectric elements may be fixedly secured to two contiguous sides of the detection element support part 1E.

In the invention, the flange parts 1F may be made regular triangular in cross section and a total of three piezoelectric elements may be attached to the sides of the flange parts 1F. Further the flange parts 1F may be formed regular pentagonal, regular hexagonal, etc., in cross section.

Further, the number of the flange parts 1F is two; in the invention, however, it may be three or more.

As described above, according to the invention, in a touch signal probe wherein a displacement detection element for detecting a contact ball coming in contact with a measured object is placed on a stylus having the contact ball for coming in contact with a measured object at a tip. The stylus has a detection element support part for supporting and fixing the displacement detection element and a rod placed on the detection element support part. The detection element support part has a plurality of flange parts each being regular polygonal in cross sectional orthogonal to an axis of the rod. The displacement detection element is attached to the sides of the flange parts in a state in which it is inclined at a predetermined angle relative to the axis of the rod. Then a contact sense signal is generated based on a signal output from the displacement detection element. Thus, if a measured force in the torsion direction occurs on the rod through the contact ball, the measured force is transmitted along substantially the length direction of the displacement detection element and the displacement detection element is enhanced in sensitivity. In contrast, if a measured force in the bend direction occurs on the rod through the contact ball, the measured force is transmitted along substantially the length direction of the displacement detection element and thus the displacement detection element is enhanced in sensitivity.

Further, a contact sense signal both when a measured force in the bend direction occurs on the rod and when a measured force in the torsion direction occurs can be generated according to the circuit configuration comprising the differential amplification circuits each for calculating the difference between the signals output from the displacement detection elements facing each other (front and back), the addition circuit for calculating the sum of the signals output from all the displacement detection elements, and the contact signal sense circuit for generating a sense signal from the contact signals generated by the differential amplification circuit and the contact signal generated by the addition circuit. Thus, the circuit configuration can be made common and the structure of the touch signal probe can be simplified.

What is claimed is:

1. A touch signal probe comprising:
   a stylus having a contact element for coming in contact with a measured object at a tip; and
   a plurality of displacement detection elements attached to the stylus, for detecting the contact element coming in contact with the measured object so that a contact sense signal is generated based on a signal output from the displacement detection elements,
   wherein the stylus has a detection element support part for supporting and fixing the displacement detection elements and a rod disposed on the detection element support part, the detection element support part having a plurality of flange parts each being regular polygonal in cross section orthogonal to an axis of the rod, and wherein the displacement detection elements are attached to at least two of sides of the flange parts in a state in which they are inclined at a predetermined angle α relative to the axis of the rod, and wherein said predetermined angle α is in a range $0° < α < 90°$.

2. The touch signal probe as claimed in claim 1, wherein the cross section of each of the flange parts orthogonal to the axis of the rod is square, and a total of four displacement detection elements are attached to the sides of the flange parts so that the displacement detection elements are spaced 90 degrees from each other.

3. The touch signal probe as claimed in claim 2, wherein the displacement detection elements are attached to the sides of the flange parts so that the displacement detection elements opposed to each other with the flange parts between become substantially mirror-symmetrical.

4. The touch signal probe as claimed in claim 2, wherein the displacement detection elements are attached to the sides of the flange parts so that the displacement detection elements opposed to each other with the flange parts between become symmetrical with respect to an axis of the stylus.

5. The touch signal probe as claimed in claim 1, wherein each of the displacement detection elements has a plane formed substantially like a parallelogram.

6. The touch signal probe as claimed in claim 1, wherein the displacement detection element is a piezoelectric element.

7. The touch signal probe as claimed in claim 6, wherein the displacement detection element is attached to the stylus in a state in which an electrode forming the displacement detection element is inclined at the predetermined angle α relative to the axis of the rod.

8. The touch signal probe as claimed in claim 1, wherein the displacement detection element is a distortion gage.

* * * * *

UNITED STATES PATENT AND TRADEMARK OFFICE
CERTIFICATE OF CORRECTION

PATENT NO. : 6,516,529 B2 Page 1 of 1
DATED : February 11, 2003
INVENTOR(S) : Hidaka et al.

It is certified that error appears in the above-identified patent and that said Letters Patent is hereby corrected as shown below:

<u>Column 12,</u>
Line 19, after "range," insert -- of --.

Signed and Sealed this

Twenty-ninth Day of April, 2003

JAMES E. ROGAN
*Director of the United States Patent and Trademark Office*